(12) United States Patent
Kikuchi et al.

(10) Patent No.: US 8,985,683 B2
(45) Date of Patent: Mar. 24, 2015

(54) ROOF APPARATUS

(71) Applicant: Aisin Seiki Kabushiki Kaisha, Kariya-shi, Aichi-ken (JP)

(72) Inventors: Mitsutoshi Kikuchi, Kariya (JP); Kazuki Sawada, Handa (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/151,089

(22) Filed: Jan. 9, 2014

(65) Prior Publication Data

US 2014/0203597 A1    Jul. 24, 2014

(30) Foreign Application Priority Data

Jan. 23, 2013    (JP) ................................. 2013-010105

(51) Int. Cl.
    *B60J 7/047*      (2006.01)
    *B60J 7/053*      (2006.01)
    *B60J 7/043*      (2006.01)

(52) U.S. Cl.
    CPC .................................... *B60J 7/0435* (2013.01)
    USPC ............ 296/216.03; 296/216.05; 296/216.08; 296/220.01

(58) Field of Classification Search
    CPC ................................ B60J 7/0435; B60J 7/053
    USPC ............. 296/216.02–216.05, 216.08, 220.01
    See application file for complete search history.

(56) References Cited

U.S. PATENT DOCUMENTS

| 4,911,496 A * | 3/1990 | Fuerst ...................... 296/220.01 |
| 2002/0125743 A1* | 9/2002 | Bohm et al. ............. 296/216.04 |
| 2012/0112499 A1 | 5/2012 | Kikuchi et al. |

FOREIGN PATENT DOCUMENTS

| EP | 2 078 630 A1 | 7/2009 |
| JP | 2012-96766 | 5/2012 |

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A roof apparatus includes a movable panel, a guide rail, a first rail portion and a second rail portion which are provided at the guide rail in a manner that at least a part of the first rail portion and at least a part of the second rail portion are overlapped with each other in the vehicle width direction, a front side guide member including a guide groove, a front side link member including a support protruding portion which is movable along the second rail portion or along the guide groove which is inclined in a vehicle upward direction towards a vehicle rear direction, and a transmission member which is movable along the first rail portion, and is linked to a rear side link member connected to the movable panel and is linked to the front side link member.

5 Claims, 11 Drawing Sheets

Inner side ← Vehicle width direction → Outer side

ROOF APPARATUS

CROSS REFERENCE TO RELATED APPLICATIONS

This application is based on and claims priority under 35 U.S.C. §119 to Japanese Patent Application 2013-010105, filed on Jan. 23, 2013, the entire content of which is incorporated herein by reference.

TECHNICAL FIELD

This disclosure generally relates to a roof apparatus.

BACKGROUND DISCUSSION

As a known roof apparatus, which includes a movable panel opening and closing an opening portion formed at a roof portion of a vehicle, various types of roof apparatuses are suggested. As illustrated in FIG. 14, for example, a known roof apparatus described in JP2012-96766A (hereinafter referred to as Patent reference 1) includes a movable panel 102 opening and closing an opening portion 101 formed at a roof portion 100 of a vehicle, and a guide rail 103 provided at a vehicle width direction edge portion of the opening portion 101 to be extended in a vehicle front/rear direction (that is, a direction orthogonal to the paper surface on which FIG. 14 is drawn). A first rail portion 103a and a second rail portion 103b are provided at the guide rail 103. A drive belt 104 for transmitting a driving force of an appropriate electric drive source is movable at the guide rail 103. A support protruding portion 105a of a front side link member 105 which is connected to a front portion of the vehicle width direction edge portion of the movable panel 102 is movable at the second rail portion 103b. At an opening edge, which is at a vehicle front portion, of the second rail portion 103b, the second rail portion 103b is in communication with a guide groove portion provided at a front side guide member (not shown). The guide groove portion is inclined in a vehicle upward direction towards the vehicle rear direction.

The drive belt 104 is linked to the front side link member 105, and is linked to a rear side link member (not shown) which is connected to a rear portion of the vehicle width direction edge portion of the movable panel 102.

In a fully-closed state of the movable panel 102, due to an operation or a movement of the rear side link member in association with movement of the drive belt 104 in the vehicle rear direction, a rear portion of the movable panel 102 is moved upwardly relative to the support protruding portion 105a which is positioned at the guide groove portion and serves as a fulcrum point of the upward movement of the movable panel 102. Thus, the movable panel 102 is brought into a so-called tilt-up state. In addition, in the tilt-up state of the movable panel 102, as the support protruding portion 105a moves or enters from the guide groove portion into the second rail portion 103b due to the movement of the drive belt 104 further in the vehicle rear direction, a front portion of the movable panel 102 is moved upwardly. Thus, the movable panel 102 is brought into a so-called pop-up state. While the pop-up state is being maintained, the support protruding portion 105a moves along the second rail portion 103b and the movable panel 102 performs a sliding movement.

According to the guide rail 103 of Patent reference 1, the first rail portion 103a, at which the drive belt 104 moves, is provided at an outer side in the vehicle width direction relative to an opening edge end of the opening portion 101. In addition, the second rail portion 103b, at which the support protruding portion 105a moves, is provided at an inner side relative to the opening edge end of the opening portion 101. As described above, because the first and second rail portions 103a and 103b are arranged so as not to be overlapped with each other in the vehicle width direction, the guide rail 103 needs to be increased in size in the vehicle width direction.

A need thus exists for a roof apparatus which is not susceptible to the drawback mentioned above.

SUMMARY

According to an aspect of this disclosure, a roof apparatus includes a movable panel for opening and closing an opening portion provided at a roof portion of a vehicle, a guide rail configured to be provided at an edge portion of the opening portion in a vehicle width direction and arranged to be extended in a vehicle front/rear direction, a first rail portion and a second rail portion which are provided at the guide rail in a manner that at least a part of the first rail portion and at least a part of the second rail portion are overlapped with each other in the vehicle width direction, the second rail portion being arranged above the first rail portion in a vehicle height direction, a front side guide member provided at a front end portion of the guide rail and including a guide groove which is inclined in a vehicle upward direction towards the vehicle rear direction and is connected to the second rail portion at a rear end of the guide groove, a front side link member including a support protruding portion which is movable along the second rail portion or along the guide groove, the front side link member being connected to a front portion of the movable panel, and a transmission member which is movable along the first rail portion, and is linked to a rear side link member connected to a rear portion of the movable panel and is linked to the front side link member, the transmission member being arranged to be extended in the vehicle rear direction and being drivably connected to an electric drive source, wherein the transmission member, in a fully-closed state of the movable panel, causes the movable panel to be in a tilt-up state by moving the rear portion of the movable panel upwardly relative to the support protruding portion which is positioned at the guide groove and serves as a fulcrum point of the movement of the movable panel in a case where the rear side link member moves in association with a movement of the transmission member in the vehicle rear direction, the transmission member causes the movable panel to be in a pop-up state by moving the front portion of the movable panel upwardly in a case where the support protruding portion enters from the guide groove into the second rail portion in association with the movement of the transmission member further in the vehicle rear direction, and the transmission member causes the movable panel to perform a sliding movement while the movable panel remains in the pop-up state.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment disclosed here will be explained. A vehicle front/rear direction will be hereinafter referred to as "a front/rear direction". Upward and downward in a vehicle height direction will be referred to as "upward" and "downward", respectively. An inner side in a vehicle width direction, which faces toward an inside of a vehicle cabin, will be referred to as "a vehicle inner side". An outer side in the vehicle width direction, which faces toward an outside of the vehicle cabin, will be referred to as "a vehicle outer side".

Figure 1:
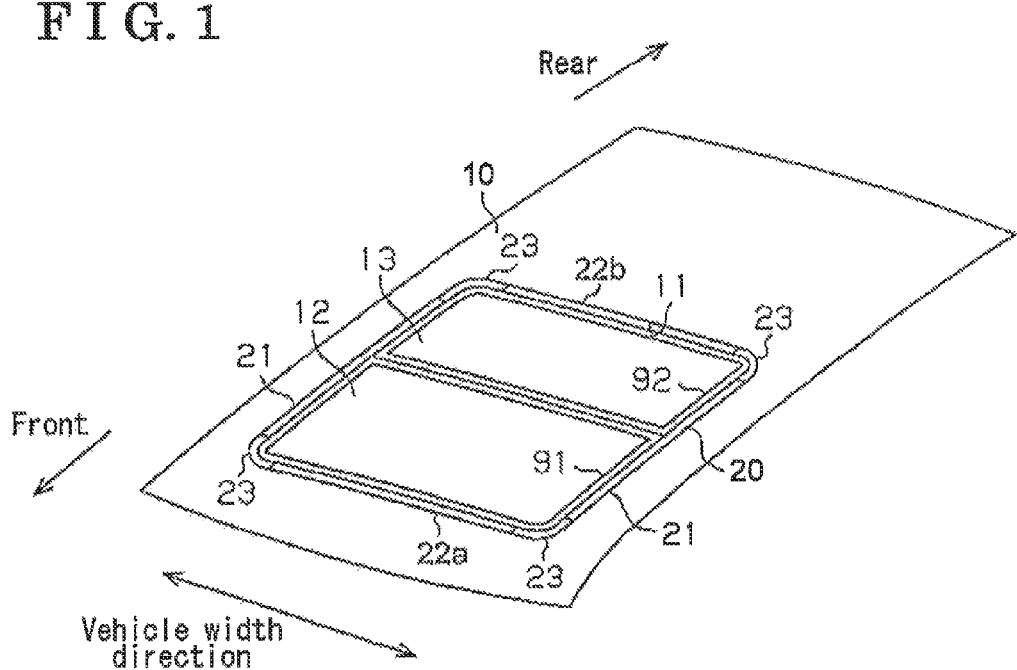
FIG. 1 is a perspective view illustrating a fully-closed state of an embodiment disclosed here.
Figure 2:
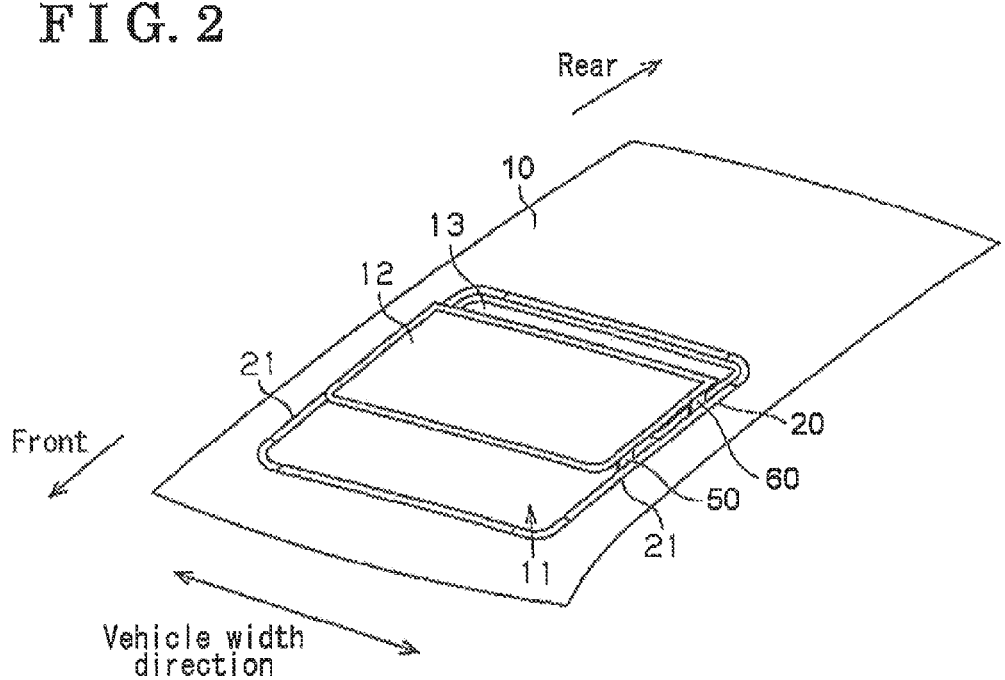
FIG. 2 is a perspective view illustrating an opened state of the embodiment.

As illustrated in FIGS. 1 and 2, a roof 10 serving as a roof portion of a vehicle including, for example, an automobile, is provided with a roof opening portion 11 which is formed in a substantially rectangular shape and serves as an opening portion. A movable panel 12 and a fixed panel 13 each of which is made of, for example, glass plate and is formed in a substantially rectangular shape are mounted on the roof 10. The movable panel 12 is attached in a manner that the movable panel 12 can open and close a front portion of the roof opening portion 11. That is, the movable panel 12 is attached in a manner that the movable panel 12 can perform a tilt-up movement, a pop-up movement and a sliding movement. In the tilt-up movement, a rear side portion of the movable panel 12 moves upwardly relative to a front side portion of the movable panel 12, which serves as a fulcrum point of the tilt-up movement. In the pop-up movement, the front-side portion and the rear-side portion of the movable panel 12 move upwardly. In the sliding movement, the movable panel 12 moves in the front/rear direction. In an open/close operation of the movable panel 12 for opening and closing the front portion of the roof opening portion 11, the movable panel 12 performs the sliding movement while being maintained in the pop-up state. That is, the roof apparatus of this embodiment is a so-called outer sliding roof apparatus. On the other hand, the fixed panel 13 is attached to always close a rear portion of the roof opening portion 11.

In addition, the roof 10 is provided with a seal member 20 which is formed in a substantially rectangular annular shape and is attached along a peripheral edge portion of the roof opening portion 11. The seal member 20 includes a pair of side weather strips 21 (i.e., a weather strip) and a pair of front/rear weather strips 22a, 22b, that is, a front weather strip 22a and a rear weather strip 22b. The side weather strips 21 are arranged at respective sides in the vehicle width direction to be extended in the front/rear direction. The front/rear weather strips 22a, 22b are arranged to be extended in the vehicle width direction. The front weather strip 22a connects front ends of the pair of side weather strips 21 with each other and the rear weather strip 22b connects rear ends of the pair of side weather strips 21 with each other. A corner portion 23, which is molded, is interposed between each of the pair of side weather strips 21 and the corresponding front/rear weather strip 22a, 22b. Each of the side weather strips 21 includes a constant cross-sectional configuration in the front/rear direction and each of the front/rear weather strips 22a, 22b includes a constant cross-sectional configuration in the vehicle width direction. The side weather strips 21, the front/rear weather strips 22a, 22b and so forth are in fluid-tightly contact with an opening end edge of the roof opening portion 11.

On the other hand, the movable panel 12 includes an edge portion 91, which for example is made of resin material and is formed in a substantially rectangular annular shape, provided along a peripheral edge portion of the movable panel 12. The fixed panel 13 includes an edge portion 92, which for example is made of resin material and is formed in a substantially rectangular annular shape, provided along a peripheral edge portion of the fixed panel 13. The edge portion 91 is fluid-tightly in contact with a front portion of each of the side weather strips 21 and with the front weather strip 22a. The edge portion 92 is fluid-tightly in contact with a rear portion of each of the side weather strips 21 and with the rear weather strip 22b. Thus, in a fully-closed state of the movable panel 12, the roof opening portion 11 is sealed over an entire periphery thereof.

When viewed from above (that is, from a design surface-side), at each of the side weather strips 21, the seal member 20 is arranged to be extended in substantially linearly over a substantially entire length of the roof opening portion 11 in the front/rear direction, including at a boundary portion between the movable panel 12 and the fixed panel 13. In addition, when viewed from above, the edge portion 91 of the movable panel 12, which is in contact with each of the side weather strips 21 in the fully-closed state, is aligned or arranged substantially linearly relative to the edge portion 92 of the fixed panel 13, which is in contact with each of the side weather strips 21 in a similar manner. That is, the edge portion 91 of the movable panel 12 and the edge portion 92 of the fixed panel 13 are arranged at equivalent positions to each other in the vehicle width direction.

Figure 3:
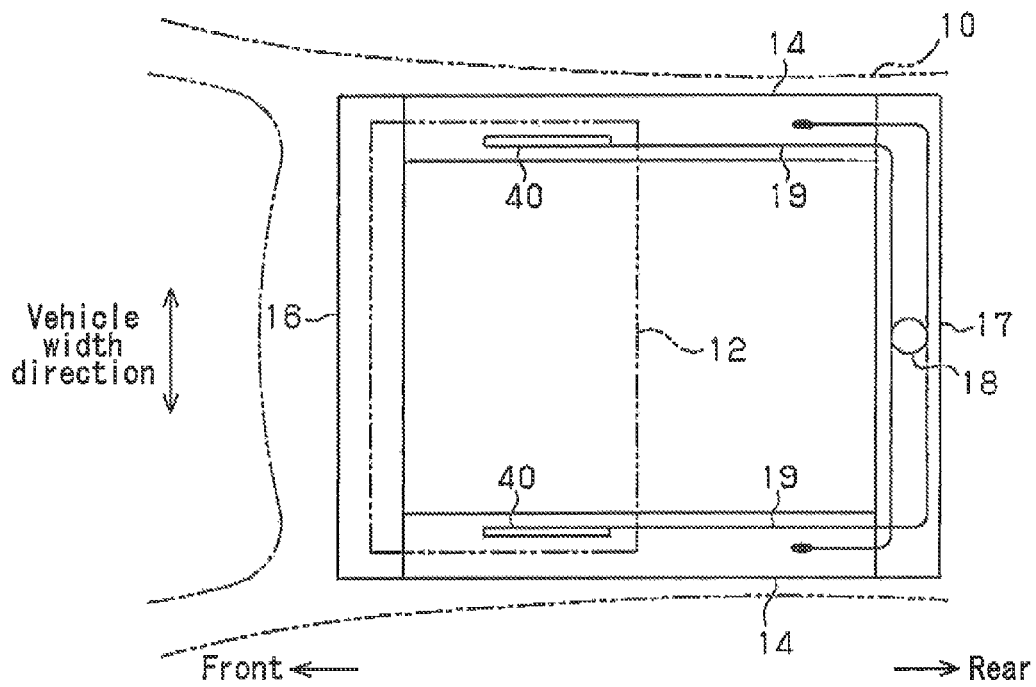
FIG. 3 is a plan view illustrating the embodiment.

As illustrated in FIG. 3, a guide rail 14 is provided at each edge portion of the roof opening portion 11 in the vehicle width direction. That is, the guide rails 14 are provided as a pair. Each of the guide rails 14 is made of, for example, extruded material of aluminum alloy. Each of the guide rails 14 includes a constant cross-section along a long-side direction thereof and is extended in the front/rear direction. A drive shoe 40, which is made of, for example, resin material, is supported at each of the guide rails 14 and is guided thereby so as to be movable in the front/rear direction. The movable panel 12 is linked to and supported at the drive shoes 40 in a manner that the movable panel 12 spans substantially between the drive shoes 40.

In addition, a front housing 15, which is provided to extend in the vehicle width direction, is connected to a front end portion of each of the guide rails 14. A rear housing 17, which is provided to extend in the vehicle width direction, is connected to a rear end portion of each of the guide rails 14. An electric drive source 18 is provided at an intermediate portion of the rear housing 17 in a long-side direction thereof. The electric drive source 18 corresponds to, for example, an electric motor which includes an output gear. The electric drive source 18 is connected to the drive shoes 40 via a pair of drive belts 19 (i.e., transmission member), each of which is made of, for example, resin material and is formed in a substantially band shape. The pair of drive belts 19 drives the drive shoes 40 so that the drive shoes 40 move in the front/rear direction together with each other. That is, each of the drive belts 19, which is related to the driving and the movement of the drive shoes 40, is extended in the vehicle rear direction from a connection portion at which the drive belt 19 is connected to the drive shoe 40, and therefore each of the drive belts 19 is configured so as not to protrude in the vehicle front direction relative to the corresponding drive shoe 40.

Figure 5:
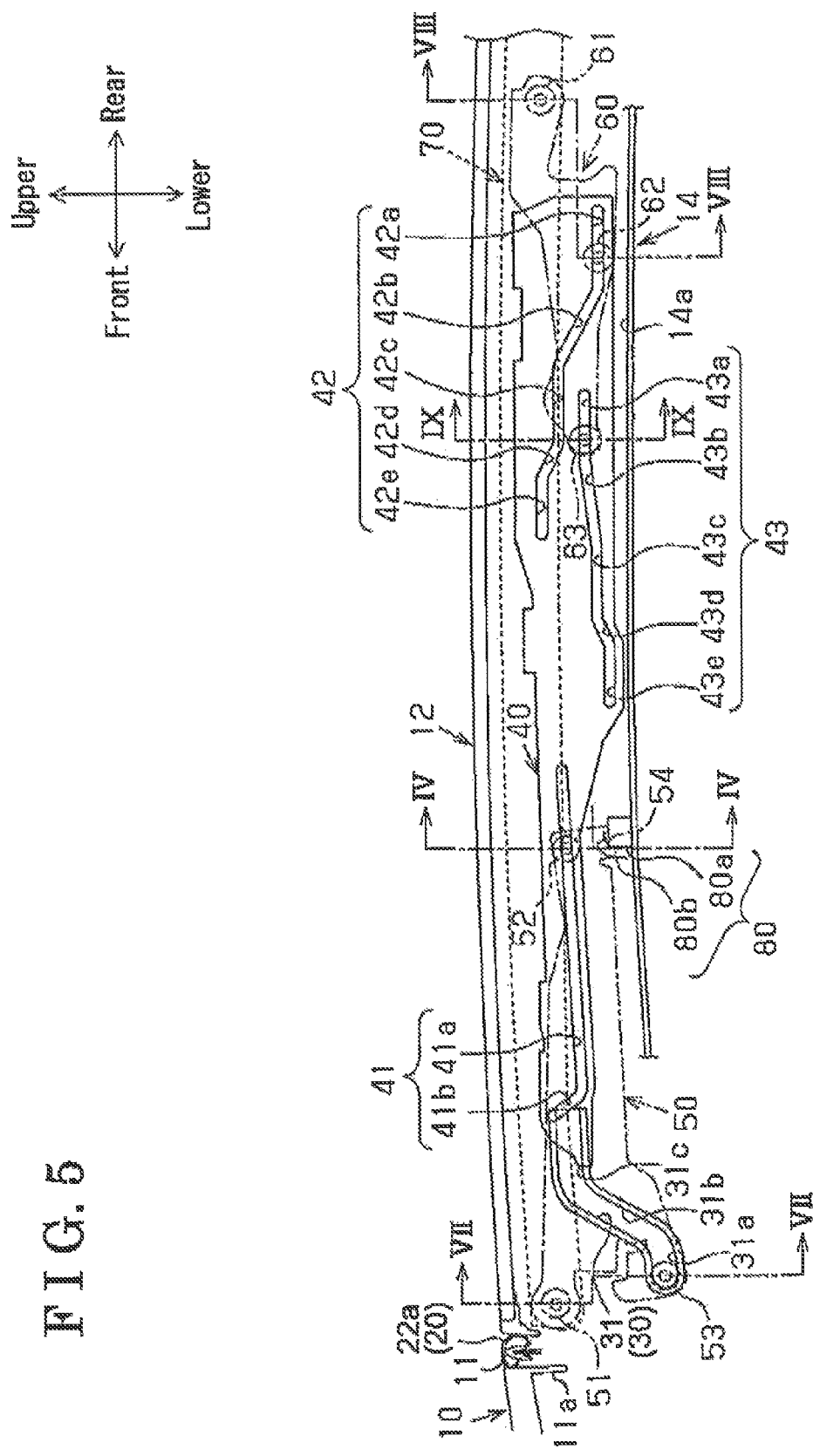
FIG. 5 is a longitudinal-sectional-view illustrating the fully-closed state of the embodiment.
Figure 10:
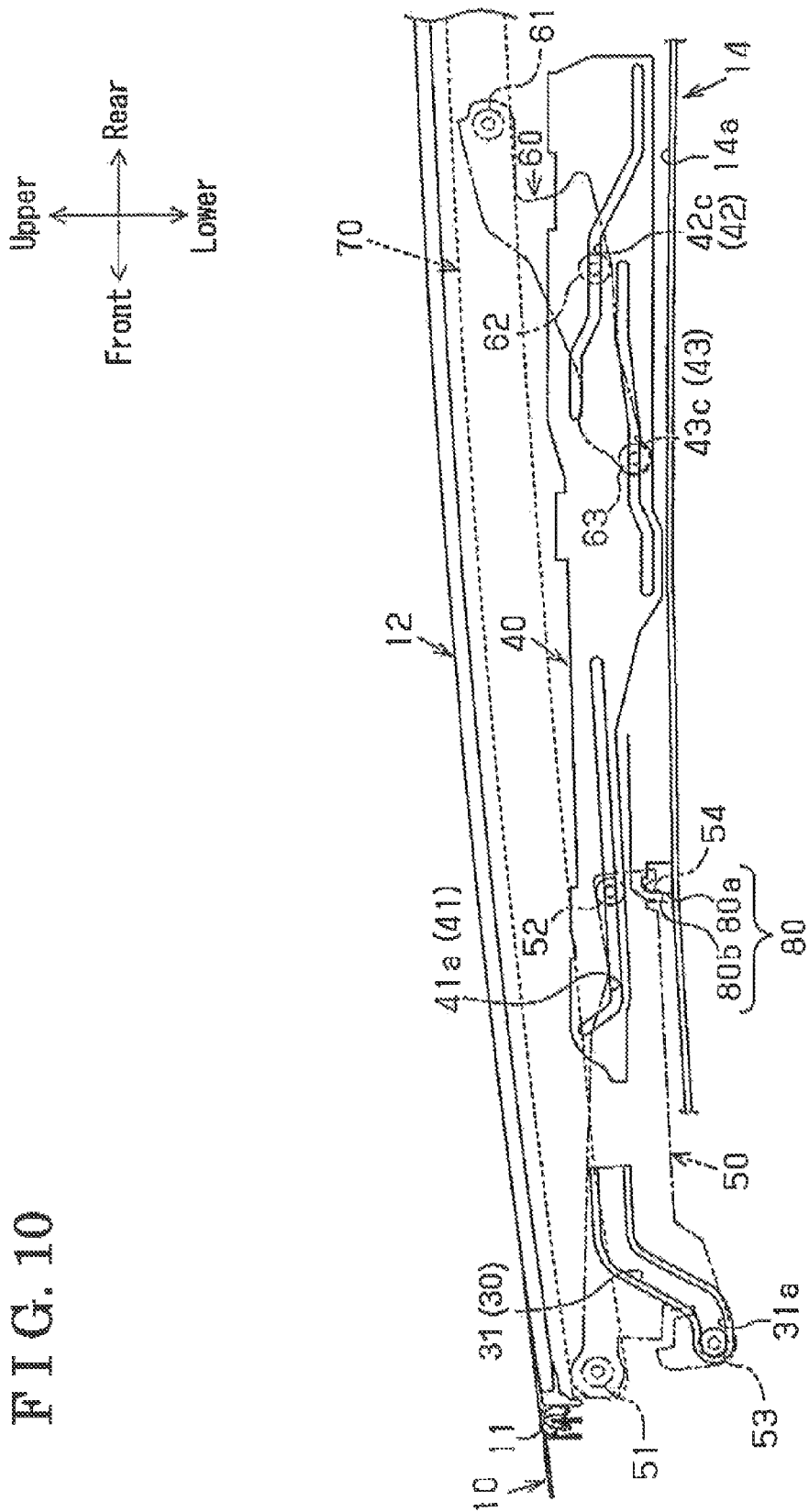
FIG. 10 is a longitudinal-sectional view illustrating a tilt-up state of the embodiment.
Figure 11:
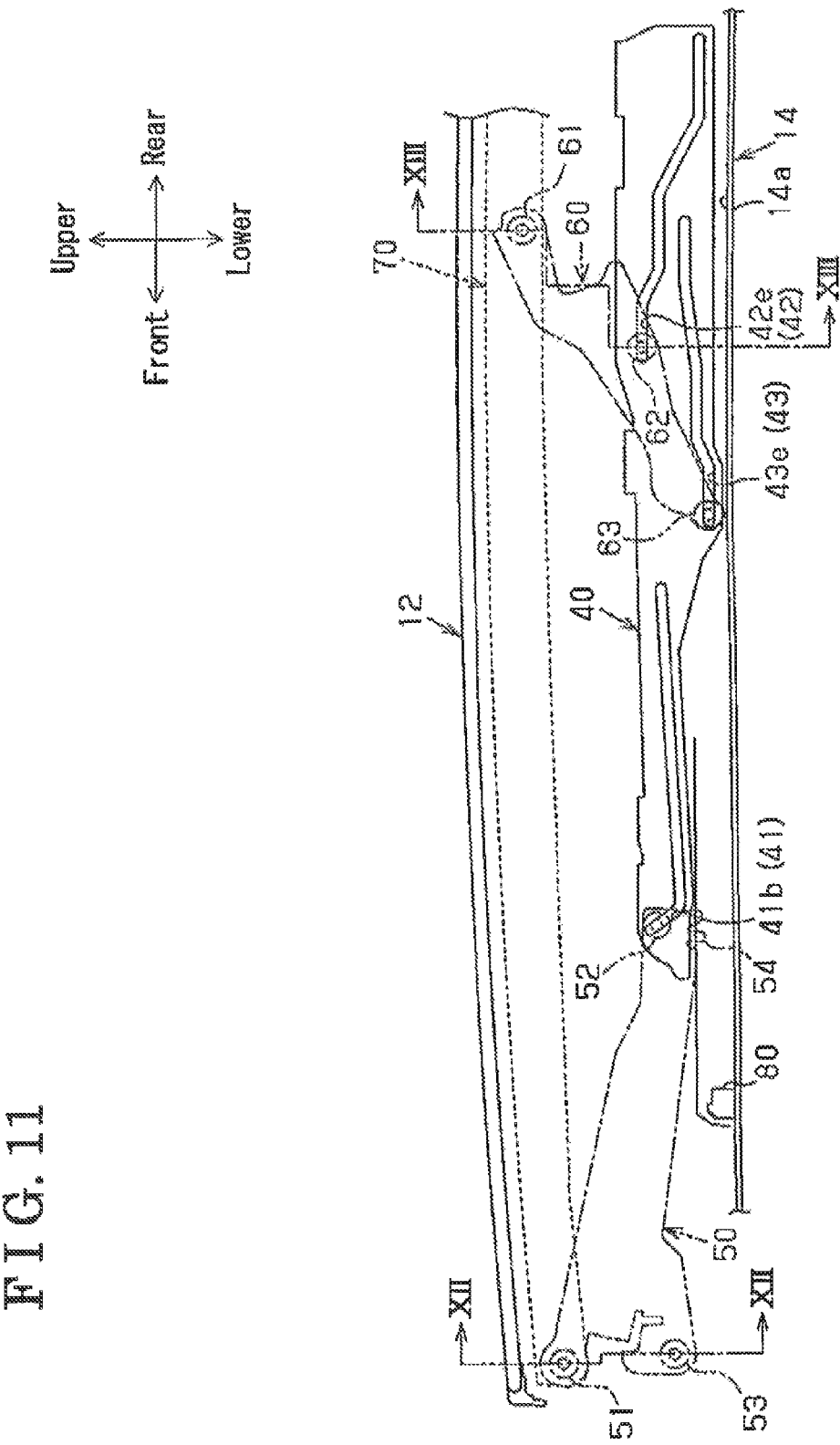
FIG. 11 is a longitudinal-sectional view illustrating a pop-up state of the embodiment.

Next, a configuration of the movable panel 12, which is related to, for example, the open/close operation thereof, will be explained. Because the configuration of the movable panel 12 is basically symmetrical (left-right symmetrical) in the vehicle width direction, the following explanation will be made to the configuration of one side in the vehicle width direction. In FIGS. 5, 10 and 11, for convenience of the explanation, some members are illustrated with different kinds of lines.

Figure 4:
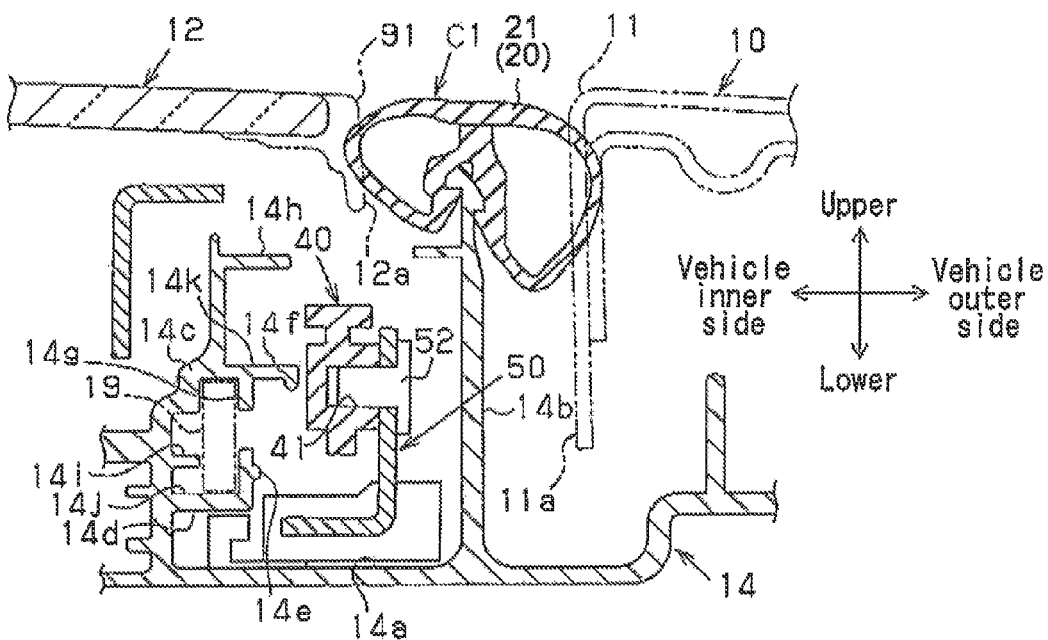
FIG. 4 is a cross-sectional view taken along line IV-IV in FIG. 5.
Figure 12:
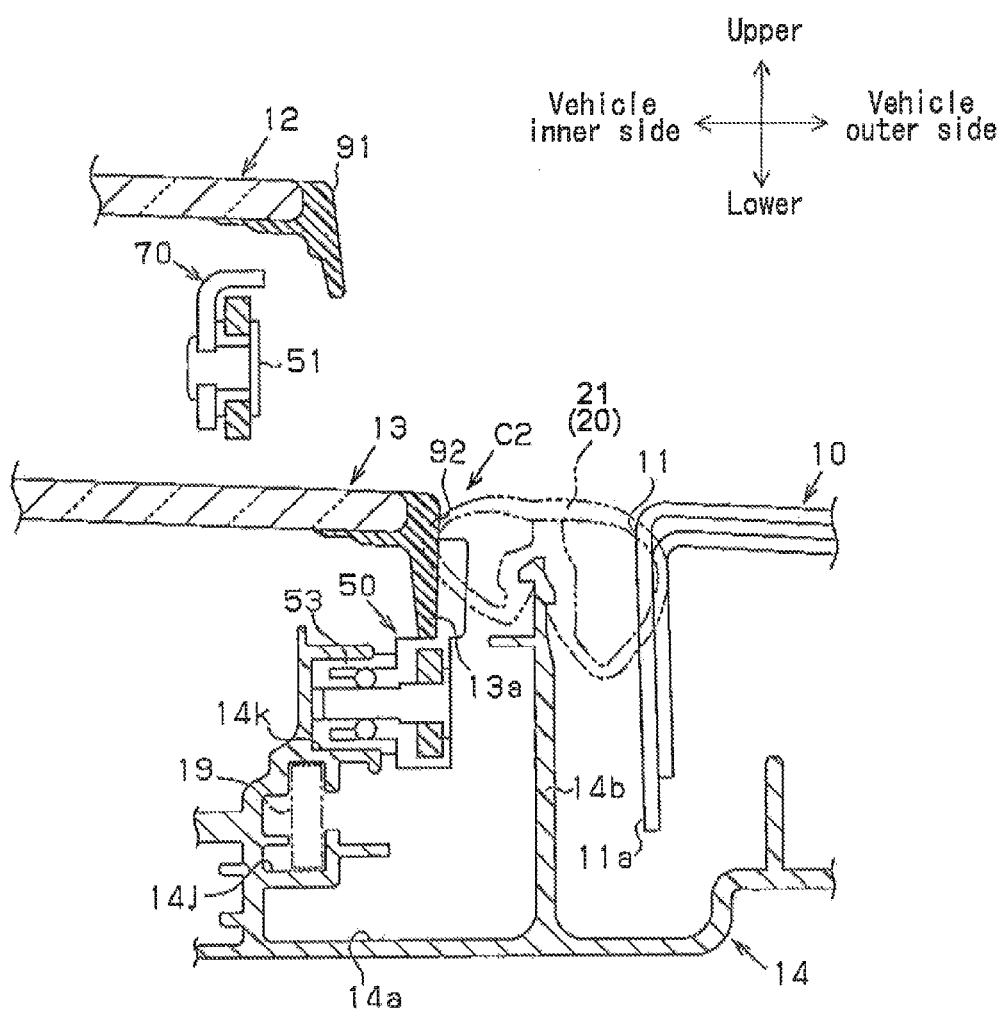
FIG. 12 is a cross-sectional view taken along line XII-XII in FIG. 11.

As illustrated in FIG. 4, the guide rail 14 includes a bottom wall 14a which is formed in a substantially elongated shape extended in the front/rear direction (that is, the direction orthogonal to the paper surface on which FIG. 4 is drawn) and a vertical wall portion 14b which is provided to stand upwardly from the bottom wall 14a. The term "vertical" includes "substantially vertical". In the vehicle width direction, the vertical wall portion 14b is arranged in a clearance C1 formed between an opening end edge 11a of the roof opening portion 11 and a vehicle width direction edge end 12a of the movable panel 12 in the fully-closed state. The opening end edge 11a and the vehicle width direction edge end 12a are formed in flange configurations extending downwardly. Alternatively, as illustrated in FIG. 12, in the vehicle width direction, the vertical wall portion 14b is arranged in a clearance C2 formed between the opening end edge 11a of the roof opening portion 11 and a vehicle width direction edge end 13a of the fixed panel 13. The vehicle width direction edge end 13a is formed in a flange configuration extending downwardly. The side weather strip 21 is attached to en upper portion of the vertical wall portion 14b so that the upper portion of the vertical wall portion 14b is fitted in the side weather strip 21.

In addition, the guide rail 14 includes a support wall portion 14c which is provided to stand upwardly from the bottom wall 14a at the vehicle inner side relative to, for example, the vehicle width direction edge end 12a of the movable panel 12. The support wall portion 14c includes a substantially crank-configuration cross section. Further, the guide rail 14 includes a support wall portion 14d which includes a substantially L-shaped cross section and is provided to be extended from a lower end portion of the support wall portion 14c toward the vehicle outer side. The guide rail 14 includes a flange portion 14e which is provided to be further extended from the support wall portion 14d toward the vehicle outer side. The guide rail 14 includes a flange portion 14i which is provided above the support wall portion 14d so as to extend from the support wall portion 14c toward the vehicle outer side. In addition, the guide rail 14 includes a support wall portion 14f which includes a substantially L-shaped cross section and is provided to be extended from an intermediate portion of the support wall portion 14c in the vehicle height direction toward the vehicle outer side. The guide rail 14 includes a flange portion 14g which is provided to be extended from the support wall portion 14f downwardly and to face or oppose an end portion of the support wall portion 14d. The guide rail 14 includes a flange portion 14h provided to be extended from an upper end portion of the support wall portion 14c toward the vehicle outer side.

In cooperation with the support wall portions 14c, 14d, 14f and the flange portions 14g and 14i, the guide rail 14 forms or defines a first rail portion 14j of which cross section is formed in a substantial shape of the letter E opening toward the vehicle outer side. In addition, in cooperation with the support wall portions 14c, 14f and the flange portion 14h, the guide rail 14 forms or defines a second rail portion 14k of which cross section is formed in a substantial shape of the letter U opening toward the vehicle outer side. Accordingly, the first rail portion 14j is arranged above the bottom wall 14a and the second rail portion 14k is arranged above the first rail portion 14j. In addition, the first and second rail portions 14j and 14k, which share the support wall portion 14f with each other, are arranged so that a part of the first rail portion 14j and a part of the second rail portion 14k are overlapped with each other in the vehicle width direction. The drive belt 19 is supported at the first rail portion 14j to be slidable (movable) in the front/rear direction.

As illustrated in FIG. 5, a front side guide member 30 made of, for example, resin material, is attached at the front end portion of the guide rail 14. At a rear side relative to the front side guide member 30 of the guide rail 14, the drive shoe 40 is supported to be slidable in the front/rear direction. A front side link member 50 and a rear side link member 60 are supported at the drive shoe 40. On the other hand, a support bracket 70, which is formed in a substantially elongated shape and is arranged to be extended in the front/rear direction above the guide rail 14, is fixedly provided at a bottom surface of the movable panel 12. The front side link member 50 and the rear side link member 60 are connected to a front end portion and a rear end portion of the support bracket 70, respectively. A restriction block 80 is fixedly provided on the bottom wall 14a of the guide rail 14.

Figure 6:
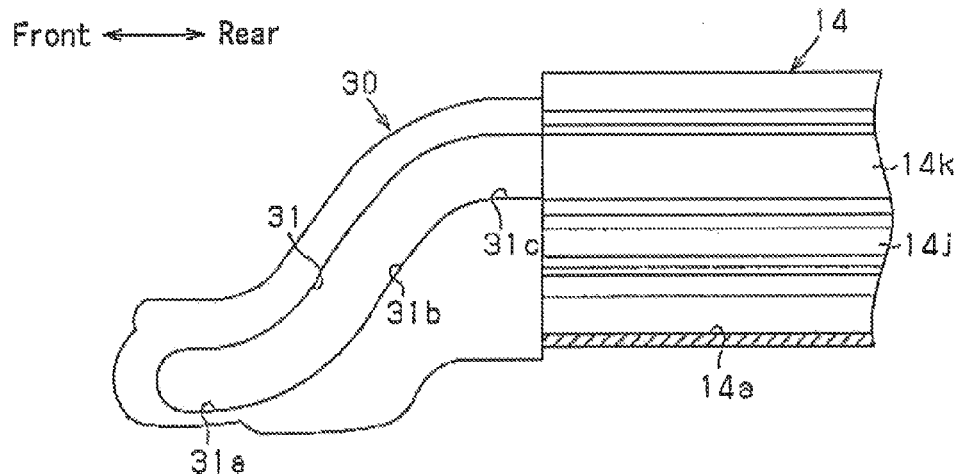
FIG. 6 is a side view illustrating a front side guide member of the embodiment.
Figure 7:
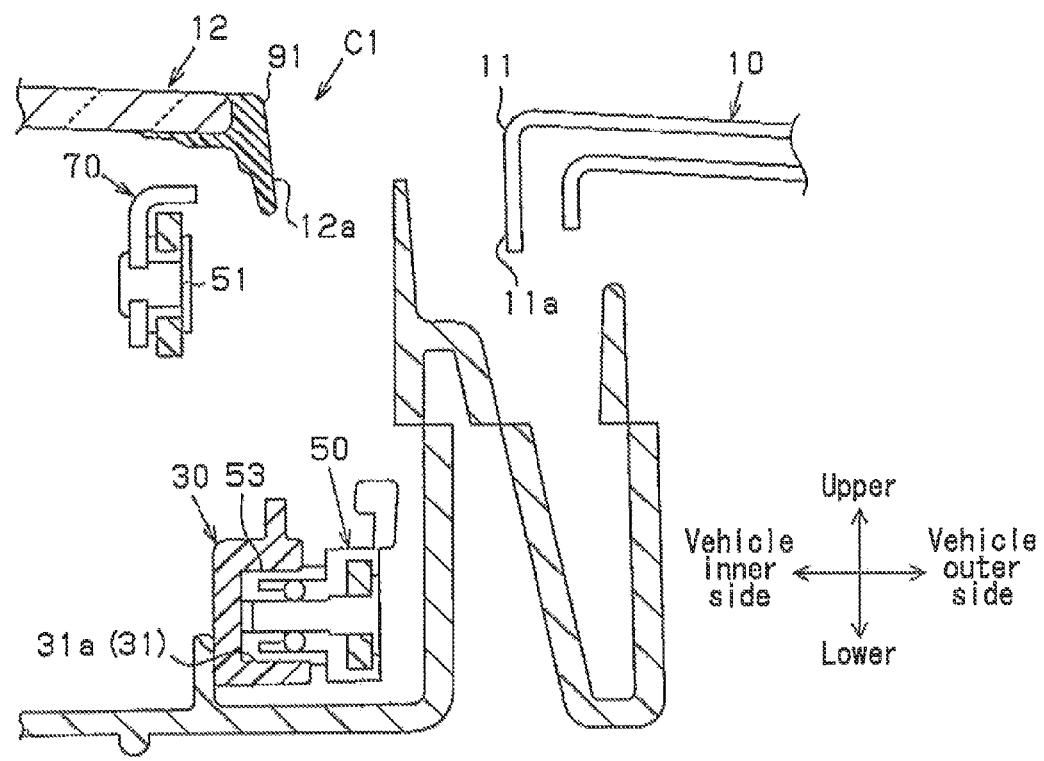
FIG. 7 is a cross-sectional view taken along line VII-VII in FIG. 5.

As illustrated in FIGS. 6 and 7, the front side guide member 30 is provided with a guide groove 31 opening towards the vehicle outer side. The guide groove 31 includes a front side groove portion 31a formed to be extended in the front/rear direction, an inclined groove portion 31b which is connected a rear end of the front side groove portion 31a and is formed to be extended obliquely upwardly in the rear direction, a rear side groove portion 31c which is connected to a rear end of the inclined groove portion 31b and is formed to be extended in the front/rear direction. The front side groove portion 31a is positioned below relative to a lowermost end of the guide rail 14 (the bottom wall 14a), and a front end of the front side groove portion 31a is closed. The rear side groove portion 31c is positioned above relative to the lowermost end of the guide rail 14 and a rear end of the rear side groove portion 31c is open. At a rear portion of the rear side groove portion 31c, the rear side groove portion 31c is in communication with the second rail portion 14k of the guide rail 14.

As illustrated in FIG. 5, the drive shoe 40 is extended in the front/rear direction so as to be accommodated or placed below, for example, the movable panel 12 when the movable panel 12 is in the fully-closed state. The drive shoe 40 includes a front side groove portion 41 (i.e., a front side guide groove portion), a first rear side groove portion 42 (i.e., a first rear side guide groove portion) and a second rear side groove portion 43 (i.e., a second rear side guide groove portion), each of which is formed in an elongated groove configuration and is formed to be recessed towards the vehicle inner side from an outer side surface, that is, a vehicle width direction outer side surface, of the drive shoe 40.

The front side groove portion 41 includes a rear side groove 41a formed to be extended in the front/rear direction and a front side groove 41b which is connected to a front end of the rear side groove 41a and is formed to be extended obliquely upwardly in the front direction. A rear end of the rear side groove 41a and a front end of the front side groove 41b are closed.

The first rear side groove portion 42 is positioned rearward relative to the front side groove portion 41, and is provided independently from the front side groove portion 41 and the second rear side groove portion 43. The first rear side groove portion 42 includes a rear side front/rear groove 42a, a rear side inclined groove 42b, an intermediate front/rear groove 42c, a front side inclined groove 42d and a front side front/rear groove 42e. The rear side inclined groove 42b is connected to a front end of the rear side front/rear groove 42a and is formed to be extended obliquely upwardly in the front direction. The intermediate front/rear groove 42c is connected to a front end of the rear side inclined groove 42b. The front side inclined groove 42d is connected to a front end of the intermediate front/rear groove 42c and is extended obliquely upwardly in the front direction. The front side front/rear groove 42e is connected to a front end of the front side inclined groove 42d. Each of the rear side front/rear groove 42a, the intermediate front/rear groove 42c and the front side front/rear groove 42e is formed to be extended in the front/rear direction. A rear end of the rear side front/rear groove 42a and a front end of the front side front/rear groove 42e are closed.

The second rear side groove portion 43 is positioned rearward relative to the front side groove portion 41, and is provided independently from the front side groove portion 41 and the first rear side groove portion 42. The second rear side groove portion 43 includes a rear side front/rear groove 43a, a rear side inclined groove 43b, an intermediate front/rear groove 43c, a front side inclined groove 43d and a front side front/rear groove 43e. The rear side inclined groove 43b is connected to a front end of the rear side front/rear groove 43a and is formed to be extended obliquely downwardly in the front direction. The intermediate front/rear groove 43c is connected to a front end of the rear side inclined groove 43b. The front side inclined groove 43d is connected to a front end of the intermediate front/rear groove 43c and is extended obliquely downwardly in the front direction. The front side front/rear groove 43e is connected to a front end of the front side inclined groove 43d. Each of the rear side front/rear groove 43a, the intermediate front/rear groove 43c and the front side front/rear groove 43e is formed to be extended in the front/rear direction. A rear end of the rear side front/rear groove 43a and a front end of the front side front/rear groove 43e are closed.

As illustrated also in FIG. 4, the drive shoe 40 is arranged above the bottom wall 14a which is interposed between the vertical wall portion 14b and the support wall portion 14f in the vehicle width direction. Plural sliding protrusions of the drive shoe 40, each of which is formed to protrude towards the vehicle inner side, are inserted in the second rail portion 14k, and thus the drive shoe 40 is guided by the second rail portion 14k and supported thereat so as to be movable in the front/rear direction. In addition, the drive shoe 40 is connected to the drive belt 19 at a connection piece which is formed at the drive shoe 40 and protrudes towards the vehicle inner side so as to come into the first rail portion 14j from between the support wall portion 14d and the flange portion 14g. Accordingly, the drive shoe 40 is configured to move in the front/rear direction in association with the drive belt 19 moving at the first rail portion 14j in the front/rear direction.

As illustrated in FIG. 5, the front side link member 50 is formed in a substantial shape of a hatchet which is extended in the front/rear direction when seen in a lateral view. A bottom portion of the front side link member 50 is arranged along the guide rail 14 so that the front side link member 50 is accommodated or placed below the movable panel 12 when the movable panel 12 is in the fully-closed state. The front side link member 50 includes a front side connection pin 51 provided at a front upper end portion of the front side link member 50 so as to protrude towards the vehicle inner side. The front side link member 50 includes a front side engagement pin 52 (i.e., a front side engagement protruding portion) provided at a rear upper end portion of the front side link member 50 so as to protrude towards the vehicle inner side. In addition, the front side link member 50 includes a front side support pin 53 (i.e., a support protruding portion) provided at a front lower end portion of the front side link member 50 so as to protrude towards the vehicle inner side. The front side link member 50 includes a restriction pin 54 formed to be positioned at a front lower side relative to the front side engagement pin 52.

As illustrated also in FIG. 4, the front side link member 50 is basically arranged above the bottom wall 14a which is interposed between the vertical wall portion 14b and the drive shoe 40 in the vehicle width direction. The front side engagement pin 52 is arranged by insertion in the front side groove portion 41 of the drive shoe 40, and is engaged at the front side groove portion 41 so as to be rotatable relative to the front side groove portion 41 and to be relatively movable in a long-side direction or longitudinal direction thereof. The front side engagement pin 52 is positioned at the rear end portion of the rear side groove 41a in the fully-closed state of the movable panel 12.

In addition, as illustrated also in FIG. 7, the front side support pin 53 is arranged by insertion in the guide groove 31 of the front side guide member 30 and is engaged at the guide groove 31 so as to be rotatable relative to the guide groove 31 and to be relatively movable in a long-side direction or longitudinal direction of the guide groove 31, for example, in the fully-closed state of the movable panel 12. The front side support pin 53 is positioned at the front end of the front side groove portion 31a in the fully-closed state of the movable panel 12. Further, a front upper end portion of the front side link member 50 is formed to be extended toward the vehicle inner side, and the front side connection pin 51 provided at the front upper end portion of the front side link member 50 is connected to the front end portion of the support bracket 70 so as to be rotatable relative thereto.

As described above, the front side engagement pin 52 protruding towards the vehicle inner side is inserted in the front side groove portion 41, and thus the front side link member 50 is connected to the drive shoe 40. Accordingly, with regard to the connection of the front side link member 50 to the drive shoe 40, the front side link member 50 does not cross the drive shoe 40 in the vehicle width direction. That is, with regard to the connection of the front side link member 50 to the drive shoe 40, the front side engagement pin 52 of the front side link member 50 does not go through or penetrate the drive shoe 40 in the vehicle width direction. On the other hand, the front side support pin 53 protruding towards the vehicle inner side is arranged by insertion in the guide groove 31, for example, in the fully-closed state of the movable panel 12, and thus the front side link member 50 is connected to the front side guide member 30. In this case, the front side support pin 53 seemingly crosses the drive shoe 40 in the vehicle width direction. That is, when seen in the vehicle front/rear direction, the front side support pin 53 seemingly crosses the drive shoe 40 in the vehicle width direction. However, the front side support pin 53 is arranged at a vehicle front side relative to a front end of the drive shoe 40, and therefore the front side support pin 53 does not interfere with the drive shoe 40 or the drive belt 19 extending rearward relative to the drive shoe 40.

As illustrated in FIG. 5, the restriction pin 54 is arranged at the front lower side relative to the front side engagement pin 52. The restriction pin 54 is positioned forward, that is, at a front side relative to the restriction block 80 in the fully-closed state of the movable panel 12, and is in contact with a restriction surface 80a, which is a front side end surface of the restriction block 80. The restriction block 80 includes a guide surface 80b formed to be extended obliquely upwardly in the rear direction from an upper edge of the restriction surface 80a.

The rear side link member 60 is formed in a substantial wrench configuration extended in the front/rear direction when seen in a lateral view. A bottom portion of the rear side link member 60 is arranged along the guide rail 14 so that the rear side link member 60 is accommodated or placed below the movable panel 12 in the fully-closed state thereof. The rear side link member 60 includes a rear side connection pin 61 provided at a rear upper end portion of the rear side link member 60 so as to protrude towards the vehicle inner side. The rear side link member 60 includes a first rear side engagement pin 62 (i.e., a first rear side engagement protruding portion) provided at a lower portion of an intermediate portion of the rear side link member 60 in a long-side direction or a longitudinal direction thereof so as to protrude towards the vehicle inner side. Further, the rear side link member 60 includes a second rear side engagement pin 63 (i.e., a second rear side engagement protruding portion) provided at a front end portion of the rear side link member 60 so as to protrude towards the vehicle inner side.

Figure 8:
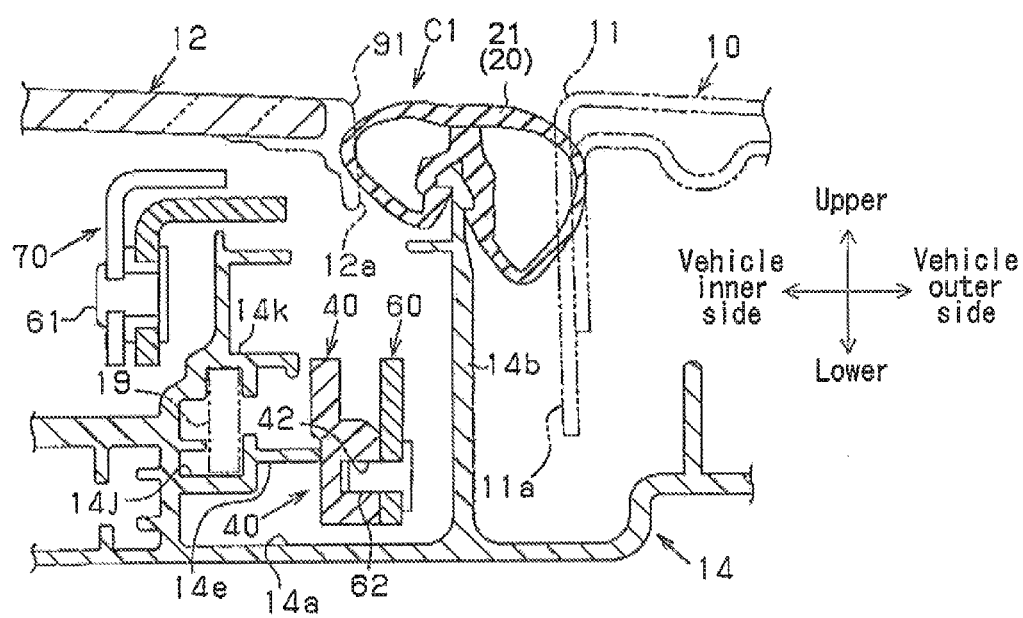
FIG. 8 is a cross-sectional view taken along line VIII-VIII in FIG. 5.

As illustrated also in FIG. 8, the rear side link member 60 is basically arranged above the bottom wall 14a which is interposed between the vertical wall portion 14b and the drive shoe 40 in the vehicle width direction. The first rear side engagement pin 62 is arranged by insertion in the first rear side groove portion 42 of the drive shoe 40. The first rear side engagement pin 62 is engaged at the first rear side groove portion 42 so as to be rotatable relative thereto and to be movable in a long-side direction or longitudinal direction of the first rear side groove portion 42 relative thereto. The first rear side engagement pin 62 is positioned at the rear side front/rear groove 42a in the fully-closed state of the movable panel 12. In addition, a rear upper end portion of the rear side link member 60 is extended towards the vehicle inner side, and the rear side connection pin 61 provided at the upper end portion of the rear side link member 60 is connected to the rear end portion of the support bracket 70 so as to be rotatable relative thereto.

Figure 9:
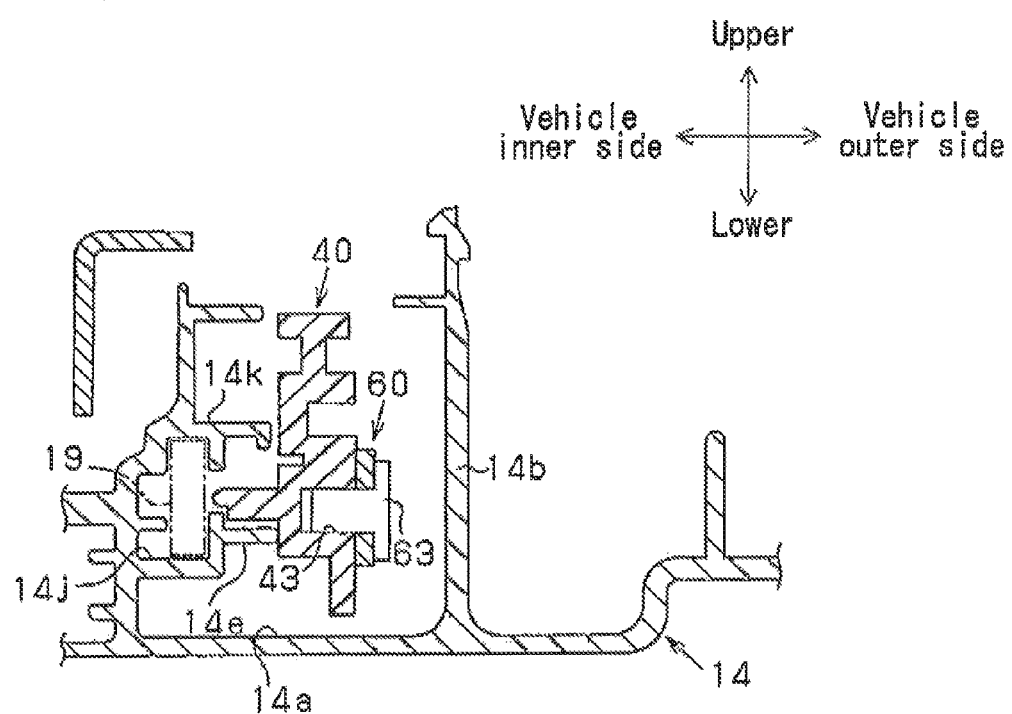
FIG. 9 is a cross-sectional view taken along line IX-IX in FIG. 5.

Further, as illustrated also in FIG. 9, the second rear side engagement pin 63 is arranged by insertion in the second rear side groove portion 43 of the drive shoe 40. The second rear side engagement pin 63 is engaged at the second rear side groove portion 43 so as to be rotatable relative thereto and to be movable in a long-side direction or longitudinal direction of the second rear side groove portion 43 relative thereto. The second rear side engagement pin 63 is positioned at the rear side front/rear groove 43a in the fully-closes state of the movable panel 12.

As described above, the first and second rear side engagement pins 62 and 63, each of which protrudes towards the vehicle inner side, are arranged respectively in the first and second rear side groove portions 42 and 43 by insertion, and thus the rear side link member 60 is connected to the drive shoe 40. Accordingly, with regard to the connection of the rear side link member 60 to the drive shoe 40, the rear side link member 60 does not cross the drive shoe 40 in the vehicle width direction. That is, with regard to the connection of the first rear side engagement pin 62 and the second rear side engagement pin 63 of the rear side link member 60 to the drive shoe 40, the first rear side engagement pin 62 or the second rear side engagement pin 63 does not go through or penetrate the drive shoe 40 in the vehicle width direction.

Here, in a case where the drive shoe 40 moves in the rear direction when the movable panel 12 is in the fully-closed state as illustrated in FIG. 5, the front side link member 50 is locked or restricted from moving in the rear direction because the restriction pin 54 is positioned at the front side relative to the restriction block 80 and is in contact with the restriction surface 80a. Thus, the drive shoe 40 moves in the rear direction relative to the front side link member 50 while allowing the front side engagement pin 52 to idle-run inside the front side groove portion 41 (the rear side groove 41a). On the other hand, the rear side link member 60 does not move in the rear direction but the rear side link member 60 moves so that the first rear side engagement pin 62 moves upwardly relative to the second rear side engagement pin 63 because the first and second rear side engagement pins 62 and 63 are guided by the rear side inclined grooves 42b and 43b of the first and second rear side groove portions 42 and 43, respectively.

Consequently, the support bracket 70 whose front end portion and rear end portion are connected to the front side link member 50 and the rear side link member 60, respectively, performs the tilt-up movement together with the movable panel 12. In the tilt-up movement, a rear side portion of the support bracket 70 moves upwardly relative to a front side portion (the front side connection pin 51) of the support bracket 70 while the front side portion serving as a fulcrum point of the movement. Then, as illustrated in FIG. 10, the transition to the tilt-up state is completed when the intermediate front/rear grooves 42c and 43c of the first and second rear side groove portions 42 and 43 reach the first and second rear side engagement pins 62 and 63 of the rear side link member 60, respectively. During the transition to the tilt-up state, the rear side portion of the movable panel 12 moves upwardly relative to the front side portion of the movable panel 12 while the front side portion of the movable panel 12 serving as a fulcrum point of the movement.

After that, in a case where the drive shoe 40 moves further in the rear direction, the front side link member 50 substantially remains locked or restricted from moving in the rear direction in a similar manner as described above. On the other hand, the rear side link member 60 does not substantially move in the rear direction because the first and second rear side engagement pins 62 and 63 are guided by the front side inclined grooves 42d and 43d of the first and second rear side groove portions 42 and 43, respectively. The rear side link member 60 moves so that the first rear side engagement pin 62 further moves upwardly relative to the second rear side engagement pin 63.

Consequently, the support bracket 70 whose front end portion and rear end portion are connected to the front side link member 50 and the rear side link member 60, respectively, further performs the tilt-up movement together with the movable panel 12. When the first and second rear side engagement pins 62 and 63 of the rear side link member 60 reach the front side front/rear grooves 42e and 43e of the first and second rear side groove portions 42 and 43, respectively, the upward movement of the first rear side engagement pin 62 relative to the second rear side engagement pin 63 is stopped. At the same time, the front end of the front side groove 41b of the front side groove portion 41 reaches the front side engagement pin 52 of the front side link member 50, and thus the front side engagement pin 52 moves so as to rise relative to the front side support pin 53, and the restriction pin 54 is displaced obliquely upwardly in the rear direction along the guide surface 80b of the restriction block 80. In addition, the movement of the drive shoe 40 in the rear direction relative to the front side engagement pin 52 (the front side link member 50) is blocked or restricted.

After that, in a case where the drive shoe 40 further moves in the rear direction, the front side link member 50 tends to move in the rear direction integrally with the drive shoe 40, and thus the restriction pin 54 rides on the restriction block 80 and the restriction on the movement in the rear direction is released.

Consequently, in a case where the drive shoe 40 further moves in the rear direction, the front side engagement pin 52 of the front side link member 50 is pulled by the front side groove 41b of the front side groove portion 41, and thus the front side link member 50 moves in the rear direction together with the rear side link member 60 and the support bracket 70 integrally therewith. At this time, a posture the rear side link member 60 is held or maintained by the first and second rear side engagement pins 62 and 63 which are arranged at the front side front/rear grooves 42e and 43e of the first and second rear side groove portions 42 and 43, respectively. On the other hand, the front side support pin 53 is guided by the guide groove 31 of the front side guide member 30, and thus the front side link member 50 rotates so that the front side connection pin 51 moves upwardly relative to the front side engagement pin 52 serving as a fulcrum point of the rotational movement. Then, the support bracket 70 whose front end portion and rear end portion are connected to the front side link member 50 and the rear side link member 60, respectively, performs the pop-up movement together with the movable panel 12. In the pop-up movement, the front side portion of the support bracket 70 moves upwardly relative to the rear side portion (the rear side connection pin 61) of the support bracket 70 while the rear side portion serving as a fulcrum point of the movement and accordingly the support bracket 70 as a whole moves upwardly relative to the roof 10.

In association with this, when the front side support pin 53 which is guided by the guide groove 31 is guided to enter the second rail portion 14k of the guide rail 14, the transition to the pop-up state, at which the movable panel 12 moves upwardly as a whole relative to the roof 10, is completed as illustrated in FIG. 11. Accordingly, as the drive shoe 40 further moves in the rear direction, the front side link member 50 moves in the rear direction together with the rear side link member 60 and the support bracket 70 integrally therewith while the front side link member 50 allowing the front side-support pin 53 to slide at the second rail portion 14k. At this time, a posture of the front side link member 50 is held or maintained by the front side engagement pin 52 arranged at the front end of the front side groove 41b of the front side groove portion 41 and by the front side support pin 53 sliding at the second rail portion 14k. At this time, the posture the rear side link member 60 is held or maintained by the first and second rear side engagement pins 62 and 63 which are arranged at the front side front/rear grooves 42e and 43e of the first and second rear side groove portions 42 and 43, respectively. Then, the movable panel 12, which remains in the pop-up state, moves in the rear direction and opens the roof opening portion 11.

During the transition from the fully-closed state to the pop-up state of the movable panel 12, the front side support pin 53 of the front side link member 50 moves up along the guide groove 31 of the front side guide member 30 and then enters the second rail portion 14k of the guide rail 14. At this time, as shown in the change from FIG. 7 to FIG. 12, a part of a trajectory of the movement of the front side support pin 53 is overlapped with a shape of a projection image, projected in the front/rear direction, of an outline of the drive belt 19 sliding at the first rail portion 14j. However, the drive belt 19 is extended further rearward from the drive shoe 40 that is arranged at a rear side relative to the front side guide member 30, and therefore the slide movement of the drive belt 19 is not blocked or obstructed by the front side support pin 53.

On the other hand, the first rear side engagement pin 62 of the rear side link member 60 is inserted in the first rear side groove portion 42 from the vehicle outer side relative to the drive shoe 40 that is arranged at the vehicle outer side relative to the drive belt 19. Thus, as is self-explanatory in the change from FIG. 8 to FIG. 13, the first rear side engagement pin 62 does not block or obstruct the slide movement of the drive belt 19. The same is applied to the second rear side engagement pin 63 of the rear side link member 60 and to the front side engagement pin 52 of the front side link member 50.

Next, in an opened state (the pop-up state) of the movable panel 12, in a case where the drive shoe 40 moves in the vehicle front direction, the front side engagement pin 52 of the front side link member 50 is pushed by the front side groove 41b of the front side groove portion 41 and the front side link member 50 moves in the vehicle front direction together with the rear side link member 60 and the support bracket 70 integrally therewith. At this time, the postures of the front side link member 50 and the rear side link member 60 are maintained in the aforementioned manners, and thus the movable panel 12 moves in the vehicle front direction and closes the roof opening portion 11 while remaining in the pop-up state.

In association with this when the front side support pin 53 that slides at the second rail portion 14k is guided to enter the guide groove 31 of the front side guide member 30, the front side link member 50 guided by the guide groove 31 rotates about a fulcrum point of the rotational movement, that is, the front side engagement pin 52, so that the front side connection pin 51 moves downwardly. Then, the front side portion of the support bracket 70, whose front end portion and rear end portion are connected to the front side link member 50 and the rear side link member 60 respectively, moves downwardly together with the movable panel 12 relative to the rear side portion of the support bracket 70 (the rear side connection pin 61) while the rear side portion of the support bracket 70 serving as a fulcrum point of the movement. Thus, the transition to the tilt-up state is completed (that is, returns to the tilt-up state). At the same time, as the front side support pin 53 reaches the front end of the front side groove portion 31a of the guide groove 31, the front side link member 50 is blocked or restricted from moving in the vehicle front direction. In addition, in association with this, the restriction pin 54 of the front side link member 50 comes to be positioned at the front side relative to the restriction block 80.

After that, in a case where the drive shoe 40 further moves in the vehicle front direction while allowing the front side engagement pin 52 to idle-run inside the front side groove portion 41 (the rear side groove 41a), the first and second rear side engagement pins 62 and 63 are guided by the first and second rear side groove portions 42 and 43, respectively. Thus, the rear side link member 60 does not move in the vehicle front direction but the rear side link member 60 moves so that the first rear side engagement pin 62 moves downwardly relative to the second rear side engagement pin 63.

Consequently, together with the movable panel 12, the front side portion of the support bracket 70 whose front end portion and rear end portion are connected to the front side link member 50 and the rear side link member 60, respectively, performs a tilt-down movement in which the rear side portion of the support bracket 70 moves downwardly relative to the front side portion of the support bracket 70 while the front side portion of the support bracket 70 serving as a fulcrum point of the movement. Then, as illustrated in FIG. 5, when the front side engagement pin 52 of the front side link member 50 reaches the rear end portion of the front side groove portion 41, the movable panel 12 returns to be in the fully-closed state.

During the transition (return) form the pop-up state to the fully-closed state of the movable panel 12, the front side engagement pin 52 and the front side support pin 63 of the front side link member 50, and the first and second rear side engagement pins 62 and 63 of the rear side link member 60 do not block or obstruct the drive belt 19 from performing the sliding movement.

Next, an operation of this embodiment will be explained. As explained above, the second rail portion 14k is arranged above the first rail portion 14j at least a part of which is overlapped with at least a part of the second rail portion 14k in the vehicle width direction, and thus size of the guide rail 14 is reduced in the vehicle width direction. That is an increase in the size of the guide rail 14 in the vehicle width direction is restricted. The front side guide member 30, at which the guide groove 31 connected to the second rail portion 14k is formed, is provided at the front and portion of the guide rail 14. Accordingly, the front side guide member 30 occupies below the second rail portion 14k when seen in a front view, that is, the front side guide member 30 occupies a space portion below the second rail portion 14k when seen in the front view. During the transition from the fully-closed state to the pop-up state of the movable panel 12, the front side support pin 53 of the front side link member 50 moves up the guide groove 31 of the front side guide member 30 and then enters the second rail portion 14k of the guide rail 14. At this time, the part of the trajectory of the movement of the front side support pin 53 is overlapped with the shape of the projection image, projected in the front/rear direction, of the outline of the drive belt 19 sliding at the first rail portion 14j. However, the drive belt 19 is arranged to be extended in the rear direction from a portion at which the drive belt 19 is linked to, for example, the rear side link member 60 arranged rearward relative to the front side guide member 30, and the drive belt 19 is drivably connected to the electric drive source 18. Therefore, the slide movement of the drive belt 19 is not blocked or obstructed by, for example, the front side support pin 53. The same is applied to the transition from the pop-up state to the fully-closed state of the movable panel 12.

As explained above in detail, the following effects and advantages are obtained according to this embodiment. (1) In this embodiment, the second rail portion 14k is arranged above the first rail portion 14j which is at least partly overlapped with the second rail portion 14k in the vehicle width direction, and thus the size of the guide rail 14 is more reduced in the vehicle width direction. Then, an opening width of the roof opening portion 11 in the vehicle width direction may be increased by an amount corresponding to the reduction of the guide rail 14 in the vehicle width direction.

(2) In this embodiment, the first rail portion 14j and the second rail portion 14k are arranged at an inner side in the vehicle width direction relative to the vertical wall portion 14b. Thus, the front side link member 50 and the rear side link member 60, which are linked to the first rail portion 14j and the second rail portion 14k, and to the drive belt 19, are arranged at a side opposite to the opening end edge 11a of the roof opening portion 11, with the vertical wall portion 14b interposed between the front side link member 50 and the rear side link member 60, and the roof opening portion 11. Therefore, in a case where the guide rail 14 is mounted on a vehicle type where a downward extension length of the flange-shaped opening end edge 11a of the roof opening portion 11 is long at a part of the flange-shaped opening end edge 11a in the front/rear direction, or is long over an entire length of the flange-shaped opening end edge 11a in the front/rear direction, an influence which is caused by the extension length and is given to mounting or arrangement of the guide rail 14 is more alleviated or reduced. As a result, a necessity to lower the mounting position of the guide rail 14 is relieved, or a necessity to reduce, in the vehicle height direction, an amount of a space portion that the first rail portion 14j or the second rail portion 14k occupies is relieved.

(3) In this embodiment, the drive shoe 40 is arranged at a vehicle inner side relative to the vertical wall portion 14b, and the drive shoe 40 is connected to the drive belt 19 and is movable along the guide rail 14. Then, the first rear side engagement pin 62 and the second rear side engagement pin 63 are movably arranged by insertion in the first rear side groove portion 42 and the second rear side groove portion 43, respectively, which are provided at the vehicle width direction outer side surface of the drive shoe 40, and accordingly the rear side link member 60 is linked to the drive belt 19. Consequently, the first rear side engagement pin 62 and the second rear side engagement pin 63 are inserted in the first rear side groove portion 42 and the second rear side groove portion 43, respectively, without crossing the drive shoe 40 in the vehicle width direction. Thus, a complexity, which may occur in a case where, for example, any one of the first rear side engagement pin 62 and the second rear side engagement pin 63 is movably arranged in the second rail portion 14k by insertion, is avoided. That is, the complexity that the one of the first rear side engagement pin 62 and the second rear side engagement pin 63 needs to cross the drive shoe 40 in the vehicle width direction by going through or penetrating the drive shoe 40 is avoided.

In addition, the front side support pin 53 of the front side link member 50 moves at, for example, the second rail portion 14k in a state where the front side support pin 53 seemingly crosses the drive shoe 40 in the vehicle width direction, however, the drive shoe 40 is arranged rearward relative to the front side support pin 53. Thus, a possibility that the movement of the drive shoe 40 is blocked or obstructed by the front side support pin 53 is reduced.

(4) In this embodiment, the front side engagement pin 52 of the front side link member 50 is arranged by insertion in the front side groove portion 41 without crossing the drive shoe 40 in the vehicle width direction. (5) In this embodiment, in a case where the movable panel 12 performs the sliding movement, the movable panel 12 is held on the guide rail 14 by the front side link member 50 and the rear side link member 60, which are arranged at front and rear, respectively, as a pair, and thus a holding rigidity for holding the movable panel 12 is enhanced.

(6) In this embodiment, the side weather strip 21 is attached to the guide rail 14, and thus there is no need to attach the side weather strip 21 at, for example, the roof 10 (a body). Accordingly, related to the side weather strips 21, assembling man-hours and/or management man-hours, which are needed at a vehicle plant, may be eliminated. In addition, unlike a case where the side weather strip 21 is attached, for example, by being adhered to the roof 10 with double-sided adhesive tape or the like, waste of the release paper removed from the adhesive tape is not generated.

(7) In this embodiment, the side weather strip 21 is attached to the guide rail 14. Accordingly, unlike a case where the weather strip is attached by inserting the opening end edge 11a of the roof opening portion 11 in the weather strip so that the opening end edge 11a is sandwiched and held at the weather strip, the side weather strip 21 is mounted without being influenced by the downward extension length of the opening end edge 11a.

Figure 13:
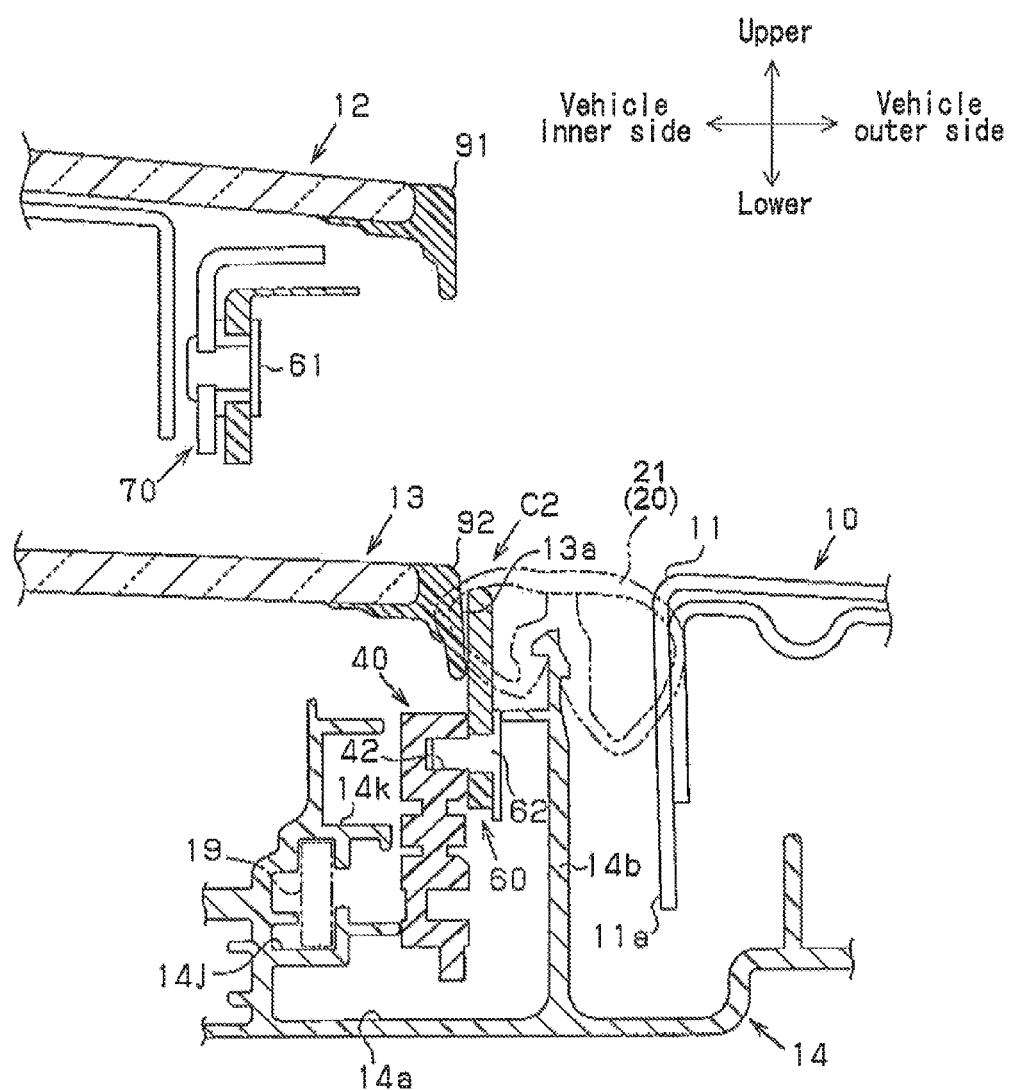
FIG. 13 is a cross-sectional view taken along line XIII-XIII in FIG. 11.
Figure 14:
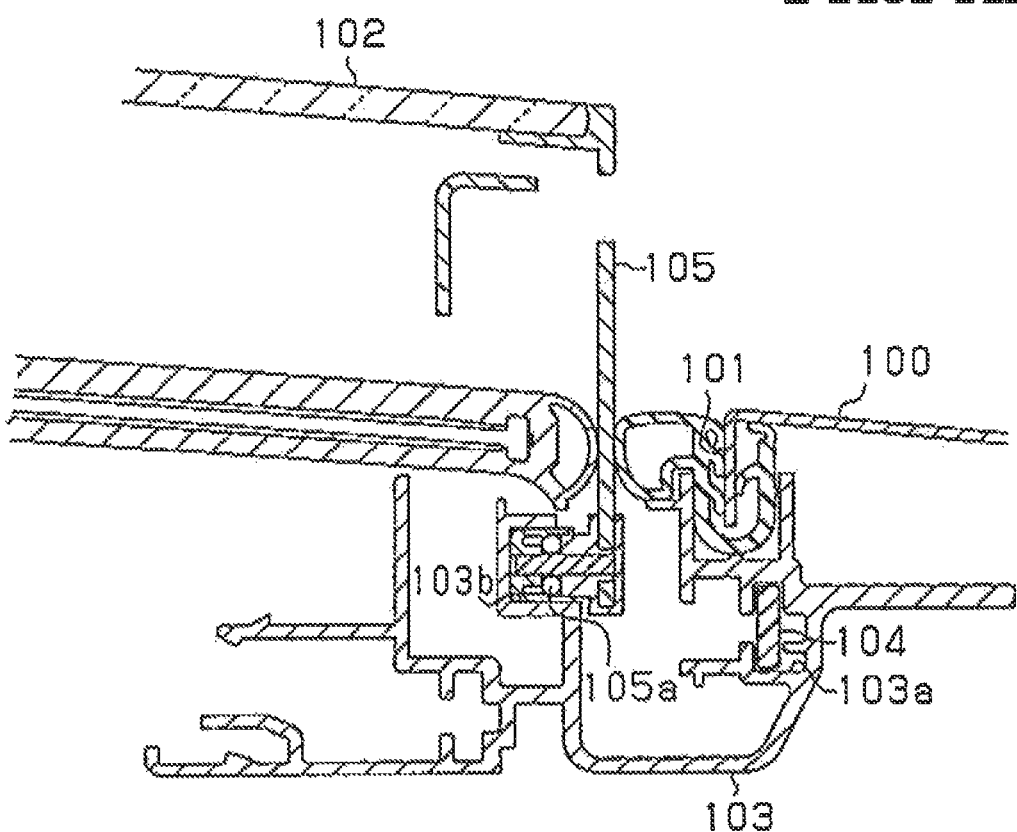
FIG. 14 is a cross-sectional view illustrating a known roof apparatus.

(8) In this embodiment, in the pop-up state that is illustrated in FIGS. 12 and 13 (and the tilt-up state) of the movable panel 12, the front side link member 50 and the rear side link member 60 protrude above the side weather strip 21 (refer to FIG. 2) via the clearance C2 (or the clearance C1), at a vehicle inner side relative to the vertical wall portion 14b. Then, the front side link member 50 and the rear side link member 60 slide at the side weather strip 21 (and the vehicle width direction edge end 13a of the fixed panel 13) in a case where the movable panel 12 performs the sliding movement in the pop-up state, and thus a need for separately or additionally providing a weather strip at the vehicle width direction edge end of the fixed panel 13 is eliminated. Thus, the edge portion 91 of the movable panel 12 and the edge portion 92 of the fixed panel 13 are arranged at equivalent positions to each other in the vehicle width direction, thereby enhancing an aesthetic quality. Compared to a case where the weather strip is separately or additionally provided at the vehicle width direction edge end of the fixed panel 13, the number of parts may be reduced.

The aforementioned embodiment may be modified as follows. In the aforementioned embodiment, the first rail portion 14j and the second rail portion 14k that is arranged at a vehicle outer side relative to the first rail portion 14j are arranged so that the part of the first rail portion 14j and the part of the second rail portion 14k are overlapped with each other in the vehicle width direction. However, for example, the first rail portion 14j and the second rail portion 14k that is arranged at a vehicle inner side relative to the first rail portion 14j may be arranged so that a part of the first rail portion 14j and a part of the second rail portion 14k are overlapped with each other in the vehicle width direction. Further, the first rail portion 14j and the second rail portion 14k may be arranged so as to be entirely overlapped with each other in the vehicle width direction.

In the aforementioned embodiment, the side weather strip 21 is attached to a unit (the guide rail 14) of the sunroof apparatus, however, the side weather strip 21 may be attached to the body (the opening end edge 11a). In this case, the vertical wall portion 14b may be omitted.

In the aforementioned embodiment, a manner in which the drive shoe 40, and the front side link member 50 and the rear side link member 60 are connected to each other is an example. For example, the front side link member 50 may include a front side groove portion which is formed to be recessed in a reverse or opposite manner to the front side groove portion 41, and a front side engagement pin which movably engages in the front side groove portion may be fixedly attached to the drive shoe. Alternatively, the rear side link member 60 may include the rear side groove portions which are formed to be recessed in a reverse or opposite manner to the first and second rear side groove portions 42 and 43, and first and second engagement pins which are movably engage in the rear side groove portions, respectively, may be fixedly attached to the drive shoe.

In the aforementioned embodiment, as the electric drive source, an electric motor which includes a nut for output may be used, for example. Then, as the transmission member, a screw axis having a flexibility which meshes with the nut and is configured to be projected/retracted by a screwing action, may be connected to the both drive shoes 40 so as to move integrally therewith.

In the aforementioned embodiment, for example, a movable panel (a rear panel) which is configured to perform the tilt-up movement may be used instead of the fixed panel 13. In the aforementioned embodiment, the fixed panel 13 and the rear portion of the roof opening portion 11 which is closed with the fixed panel 13 may be omitted.

Next, technical ideas that can be perceived from the aforementioned embodiment and from the other examples or modifications will be additionally described below. (A) The roof apparatus according to the aforementioned embodiment, wherein the movable panel is for opening and closing a front portion of the opening portion, the roof apparatus includes a rear panel for closing a rear portion of the opening portion, and an edge portion of the movable panel and an edge portion of the rear panel are arranged at equivalent positions to each other in the vehicle width direction. According to the above described structure, the edge portion of the movable panel and the edge portion of the rear panel are arranged at the equivalent positions to each other in the vehicle width direction so as to be arranged substantially linearly in the vehicle front/rear direction. As a result, the aesthetic quality is enhanced.

According to the aforementioned embodiment, the roof apparatus includes the movable panel 12 for opening and closing the roof opening portion 11 provided at the roof 10 of the vehicle, the guide rail 14 configured to be provided at the edge portion of the roof opening portion 11 in the vehicle width direction and arranged to be extended in the vehicle front/rear direction, the first rail portion 14j and the second rail portion 14k which are provided at the guide rail 14 in a manner that at least the part of the first rail portion 14j and at least the part of the second rail portion 14k are overlapped with each other in the vehicle width direction, the second rail portion 14k being arranged above the first rail portion 14j in the vehicle height direction, the front side guide member 30 provided at the front end portion of the guide rail 14 and including the guide groove 31 which is inclined in the vehicle upward direction towards the vehicle rear direction and is connected to the second rail portion 14k at the rear end of the guide groove 31, the front side link member 50 including the front side support pin 53 which is movable along the second rail portion 14k or along the guide groove 31, the front side link member 50 being connected to the front portion of the movable panel 12, and the drive belt 19 which is movable along the first rail portion 14j, and is linked to the rear side link member 60 connected to the rear portion of the movable panel 12 and is linked to the front side link member 50, the drive belt 19 being arranged to be extended in the vehicle rear direction and being drivably connected to the electric drive source 18, wherein the drive belt 19, in the fully-closed state of the movable panel 12, causes the movable panel 12 to be in the tilt-up state by moving the rear portion of the movable panel 12 upwardly relative to the front side support pin 53 which is positioned at the guide groove 31 and serves as the fulcrum point of the movement of the movable panel 12 in a case where the rear side link member 60 moves in association with the movement of the drive belt 19 in the vehicle rear direction, the drive belt 19 causes the movable panel 12 to be in the pop-up state by moving the front portion of the movable panel 12 upwardly in a case where the front side support pin 53 enters from the guide groove 31 into the second rail portion 14k in association with the movement of the drive belt 19 further in the vehicle rear direction, and the drive belt 19 causes the movable panel 12 to perform the sliding movement while the movable panel 12 remains in the pop-up state.

According to the above described structure, the second rail portion 14k is provided above the first rail portion 14j in the vehicle height direction, at least the part of which is overlapped with the second rail portion 14k in the vehicle width direction, and accordingly the guide rail 14 may be more reduced in size in the vehicle width direction. Because the front side guide member 30, at which the guide groove 31 connected to the second rail portion 14k is formed, is provided at the front end portion of the guide rail 14, the front side guide member 30 occupies below the second rail portion 14k in the vehicle height direction. In the transition from the fully-closed state to the pop-up state of the movable panel 12, the front side support pin 53 of the front side link member 50 moves up the guide groove 31 of the front side guide member 30 and then enters the second rail portion 14k. At this time, the part of the trajectory of the movement of the front side support pin 53 is overlapped with the shape of the projection image, projected in the front/rear direction, of the outline of the drive belt 19 moving at the first rail portion 14j. However, the drive belt 19 is arranged to be extended rearward in the vehicle front/rear direction and is drivably connected to the electric drive source 18. Consequently, the slide movement of the drive belt 19 is not blocked or obstructed by the front side support pin 53 in a case where, for example, the portion at which the drive belt 19 is linked to the rear side link member 60 and the like is arranged at the vehicle rear side relative to the front side guide member 30.

According to the above described structure, the increase of the size of the guide rail 14 in the vehicle width direction may be restricted.

According to the aforementioned embodiment, the guide rail 14 includes the vertical wall portion 14b which is arranged to be extended in the vehicle front/rear direction at the outer side in the vehicle width direction relative to the first rail portion 14j and the second rail portion 14k, and the guide rail 14 is attached with the side weather strip 21 which is fluid-tightly in contact with the vehicle width direction edge end 12a of the movable panel 12 and with the opening end edge lie of the roof opening portion 11, which is formed in a flange configuration extending downwardly.

According to the above described structure, the first rail portion 14j and the second rail portion 14k are arranged at the inner side in the vehicle width direction relative to the vertical wall portion 14b. Thus, the front side link member 50 and the rear side link member 60, which are linked to the first rail portion 14j and the second rail portion 14k, and to the drive belt 19, are arranged at a side opposite to the opening end edge 11a of the roof opening portion 11 in the vehicle width direction, with the vertical wall portion 14b interposed between the front side link member 50 and the rear side link member 60, and the roof opening portion 11. Therefore, in a case where the guide rail 14 is mounted on the vehicle type where the downward extension length of the flange-shaped opening end edge 11a of the roof opening portion 11 is long at the part of the flange-shaped opening end edge 11a in the front/rear direction, or is long over the entire length of the flange-shaped opening end edge 11a in the front/rear direction, the influence which is caused by the extension length and is given to the mounting or arrangement of the guide rail 14 is more alleviated or reduced. Then, the necessity to lower the mounting position of the guide rail 14 is relieved, or the necessity to reduce, in the vehicle height direction, the amount of the space portion that the first rail portion 14j or the second rail portion 14k occupies is relieved.

According to the aforementioned embodiment, the roof apparatus includes the drive shoe 40 arranged at the inner side in the vehicle width direction relative to the vertical wall portion 14b and at the vehicle rear side relative to the front side support pin 53, the drive shoe 40 being connected to the drive belt 19 and provided movably along the guide rail 14, the drive shoe 40 including the first rear side groove portion 42 and the second rear side groove portion 43 which are provided at the vehicle width direction outer side surface of the drive shoe 40, wherein the rear side link member 60 includes the first rear side engagement pin 62 and the second rear side engagement pin 63 which are movably arranged by insertion in the first rear side groove portion 42 and the second rear side groove portion 43, respectively, to link the rear side link member 60 to the drive belt 19.

According to the above described structure, the drive shoe 40 is arranged at the inner side in the vehicle width direction relative to the vertical wall portion 14b, and the drive shoe 40 is connected to the drive belt 19 and is movable along the guide rail 14. Then, the first rear side engagement pin 62 and the second rear side engagement pin 63 are movably arranged by insertion in the first rear side groove portion 42 and the second rear side groove portion 43 that are provided at the outer side surface of the drive shoe 40 in the vehicle width direction, respectively, and thus the rear side link member 60 is linked to the drive belt 19. Accordingly, by arranging the rear side link member 60 at the outer side in the vehicle width direction relative to the drive shoe 40, the first rear side engagement pin 62 and the second rear side engagement pin 63 are inserted in the first rear side groove portion 42 and the second rear side groove portion 43, respectively, without crossing the drive shoe 40 in the vehicle width direction. Thus, the complexity, which may occur in a case where, for example, any one of the first rear side engagement pin 62 and the second rear side engagement pin 63 is movably arranged in the second rail portion 14k by insertion, is avoided. That is, the complexity that the one of the first rear side engagement pin 62 and the second rear side engagement pin 63 needs to cross the drive shoe 40 in the vehicle width direction is avoided.

In addition, because the drive shoe 40 is arranged at the vehicle rear side relative to the front side support pin 53, the possibility that the movement of the drive shoe 40 may be blocked or obstructed by the front side support pin 53 is reduced even in a case where, for example, the front side support pin 53 moves at the second rail portion 14k and the like in a state where the front side support pin 53 seemingly crosses the drive shoe 40 in the vehicle width direction.

According to the aforementioned embodiment, the vehicle width direction outer side surface of the drive shoe 40 is provided with the front side groove portion 41 and the front side link member 50 includes the front side engagement pin 52 which is movably arranged by insertion in the front side groove portion 41 to link the front side link member 50 to the drive bell 19.

According to the above described structure, by arranging the front side link member 50 at an outer side in the vehicle width direction relative to the drive shoe 40, the front side engagement pin 52 is arranged by insertion in the front side groove portion 41 without crossing the drive shoe 40 in the vehicle width direction.

According to the aforementioned embodiment, in the pop-up state of the movable panel 12, at an inner side in the vehicle width direction relative to the vertical wail portion 14b, the front side link member 50 and the rear side link member 60 protrude above the side weather strip 21 via the clearance C1 formed between the vehicle width direction edge end 12a of the movable panel 12 and the opening end edge 11a of the roof opening portion 11, and the front side link member 50 and the rear side link member 60 slide at the side weather strip 21 in a case where the movable panel 12 performs the sliding movement in the pop-up state.

According to the above described structure, a need for separately or additionally providing a weather strip at an edge end of the fixed panel 13 in the vehicle width direction is eliminated. Compared to a case where the weather strip is separately or additionally provided at the vehicle width direction edge end of the fixed panel 13, the number of parts may be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roof apparatus comprising;
a movable panel for opening and closing an opening portion provided at a roof portion of a vehicle;
a guide rail configured to be provided at an edge portion of the opening portion in a vehicle width direction and arranged to be extended in a vehicle front/rear direction;
a first rail portion and a second rail portion which are provided at the guide rail in a manner that at least a part of the first rail portion and at least a part of the second rail portion are overlapped with each other in the vehicle width direction, the second rail portion being arranged above the first rail portion in a vehicle height direction;
a front side guide member provided at a front end portion of the guide rail and including a guide groove which is inclined in a vehicle upward direction towards the vehicle rear direction and is connected to the second rail portion at a rear end of the guide groove;
a front side link member including a support protruding portion which is movable along the second rail portion or along the guide groove, the front side link member being connected to a front portion of the movable panel; and
a transmission member which is movable along the first rail portion, and is linked to a rear side link member connected to a rear portion of the movable panel and is linked to the front side link member, the transmission member being arranged to be extended in the vehicle rear direction and being drivably connected to an electric drive source, wherein
the transmission member, in a fully-closed state of the movable panel, causes the movable panel to be in a tilt-up state by moving the rear portion of the movable panel upwardly relative to the support protruding portion which is positioned at the guide groove and serves as a fulcrum point of the movement of the movable panel in a case where the rear side link member moves in association with a movement of the transmission member in the vehicle rear direction,
the transmission member causes the movable panel to be in a pop-up state by moving the front portion of the movable panel upwardly into a case where the support protruding portion enters from the guide groove in the second rail portion in association with the movement of the transmission member further in the vehicle rear direction, and
the transmission member causes the movable panel to perform a sliding movement while the movable panel remains in the pop-up state.

2. The roof apparatus according to claim 1, wherein
the guide rail includes a vertical wall portion which is arranged to be extended in the vehicle front/rear direction at an outer side in the vehicle width direction relative to the first rail portion and the second rail portion, and
the guide rail is attached with a weather strip which is fluid-tightly in contact with a vehicle width direction edge end of the movable panel and with an opening end edge of the opening portion, which is formed in a flange configuration extending downwardly.

3. The roof apparatus according to claim 2, further comprising:
a drive shoe arranged at an inner side in the vehicle width direction relative to the vertical wall portion and at a vehicle rear side relative to the support protruding portion, the drive shoe being connected to the transmission member and provided movably along the guide rail, the drive shoe including a first rear side guide groove portion and a second rear side guide groove portion which are provided at a vehicle width direction outer side surface of the drive shoe, wherein
the rear side link member includes a first rear side engagement protruding portion and a second rear side engagement protruding portion which are movably arranged by insertion in the first rear side guide groove portion and the second rear side guide groove portion, respectively, to link the rear side link member to the transmission member.

4. The roof apparatus according to claim 3, wherein
the vehicle width direction outer side surface of the drive shoe is provided with a front side guide groove portion and
the front side link member includes a front side engagement protruding portion which is movably arranged by insertion in the front side guide groove portion to link the front side link member to the transmission member.

5. The roof apparatus according to claim 2, wherein
in the pop-up state of the movable panel, at an inner side in the vehicle width direction relative to the vertical wall portion, the front side link member and the rear side link member protrude above the weather strip via a clearance formed between the vehicle width direction edge end of the movable panel and the opening end edge of the opening portion and
the front side link member and the rear side link member slide at the weather strip in a case where the movable panel performs the sliding movement in the pop-up state.

* * * * *